Patented Aug. 24, 1926.

1,596,971

UNITED STATES PATENT OFFICE.

WILLY O. HERRMANN AND HANS DEUTSCH, OF MUNICH, GERMANY, ASSIGNORS TO CONSORTIUM FÜR ELEKTROCHEMISCHE INDUSTRIE G. M. B. H., OF MUNICH, BAVARIA.

REFINING ALDEHYDE RESINS.

No Drawing. Application filed June 15, 1922. Serial No. 568,628, and in Germany June 29, 1921.

Our invention relates to aldehyde-resins and it is an object of our invention to provide means for refining such resins so as to render them resistive against the action of water. The artificial resins hitherto obtained by condensation and polymerization of aldehydes with condensing agents are more or less liable to be attacked by water, and when treated with water, especially at an elevated temperature, they are covered with a muddy layer.

We have now discovered that it is possible to greatly improve these products by subjecting the resinous products of condensation and polymerization of aldehydes to a refining process.

We have discovered that by acting on finely subdivided aldehyde resins with large quantities of water, the physical properties of the resins are altogether changed, the resins being subjected to a colloidal swelling process whereby they are converted after subsequent drying into a gel of altogether different properties which are evidenced by fact that if these resins are subsequently treated with water, no swelling will occur and the water will no more act on them. The products obtained are suitable for rolling into shellac-like sheets.

This process may be carried out in different ways. The aldehyde-resin-products may for instance be treated in finely subdivided condition with water according to a wet-milling-process in a crushing and grinding machine. This process may be further improved by the addition of an acid.

*Example 1.*

100 parts of a resin-like product, obtained by condensation and polymerization of acetaldehyde with a small quantity of caustic soda are ground for several hours in a porcelain ball mill with 200 parts of a 3 per cent solution of acetic acid solution in water, a fine suspension of the swelled resin-particles being obtained. The resin is separated by filtering and may be melted. Instead of a ball mill other mechanical crushing and grinding means may be employed. The process may also be carried out by dissolving the resinous products in an organic solvent such as alcohol, glacial acetic acid, or acetone and by precipitating the dissolved aldehyde resins from the solution, preferably with water.

*Example 2.*

To 600 parts of a 4 per cent caustic soda solution are added 2000 parts of acetaldehyde while cooling and stirring. The temperature is kept for some time between 40 and 100 degrees centigrade and the volatile components are then distilled off. Heating is continued for some time at temperatures above 100 degrees centigrade. Hereafter the resin formed is dissolved in 2000 parts of glacial acetic acid, then precipitated from the solution by adding water and filtered off. This step of first dissolving and thereafter precipitating is characteristic for the treatment of the resin in order to finely distribute it.

It is immaterial in which phase of the condensation and polymerization of aldehydes the refining of the resinous products formed is effected. Thus the viscous resinous substances which are obtained as initial products of condensation by the reaction between an aldehyde and a condensing agent may be treated with water or water and an acid, for instance in a kneading machine or dissolved in an organic solvent and precipitated therefrom. The resin-like products thus obtained may thereafter be hardened for instance by a heat treatment such as described in our copending application for patent of the United States Ser. No. 458610 (filed April 4th 1921).

*Example 3.*

100 parts of a 4 per cent caustic soda solution and 500 parts of crotonic aldehyde are allowed to react while stirring and cooling. The precipitated viscous resin is dissolved in 1500 parts of acetone and precipitated from this solution by adding water. The precipitated resin, preferably after having been washed, is subjected to a continued heat treatment at temperatures above 100 degrees centigrade until it is hardened sufficiently. For many purposes the melting of the amorphous resin obtained by the refining process described can be dispensed with and the resin separated can be directly dissolved in an organic solvent in order to get solutions for varnishing or polishing purposes.

When melted after being cleaned according to the process described the resin can be obtained in form of morsels, plates, sheets, powder or the like. The molten resin may also be rolled out in a rolling apparatus so that shellac-like sheets are obtained. In order to directly obtain varnishes the molten resin may be dissolved directly in a suitable solvent for instance linseed oil.

The aldehyde resins obtained by the refining process described can be used in the place of shellac, copal, amber and the like. Being soluble in the organic solvents used in the manufacture of varnishes they are especially suitable for making solutions for varnishing, polishing, and impregnating purposes. We wish it to be understood that we do not desire to be limited to the exact proportions and operations described, for obvious modifications will occur to a person skilled in the art.

We claim:

1. The method of refining artificial aldehyde resins which comprises treating the product of reaction between an aldehyde and a resinifying agent in a state of fine suspension with water.

2. The method of refining artificial aldehyde resins which comprises treating the product of reaction between an aldehyde and a resinifying agent in a state of fine suspension with water and an acid.

3. The method of refining artificial aldehyde resins which comprises treating the product of reaction between an aldehyde and a resinifying agent in a state of fine suspension with water, remelting the resin thus refined and subjecting the molten product to a heat treatment at temperatures above 100 degrees C.

4. The method of refining artificial aldehyde resins which comprises treating the product of reaction between an aldehyde and a resinifying agent in a state of fine suspension with water, dissolving the resin to be refined in an organic solvent, precipitating it from its solution and remelting it.

5. The method of refining artificial aldehyde resins which comprises treating the product of reaction between an aldehyde and a resinifying agent in a state of fine suspension with water and an acid, remelting the resin thus refined and subjecting the molten product to a heat treatment at temperatures above 100 degrees C.

6. The method of refining artificial aldehyde resins which comprises treating the product of reaction between an aldehyde and a resinifying agent in a state of fine suspension with water and an acid, dissolving the resin to be refined in an organic solvent, precipitating it from its solution and remelting it.

In testimony whereof we affix our signatures.

Dr. WILLY O. HERRMANN.
Dr. HANS DEUTSCH.